US011506078B1

(12) United States Patent
Ellwood, III et al.

(10) Patent No.: US 11,506,078 B1
(45) Date of Patent: Nov. 22, 2022

(54) TURBOCHARGER INCLUDING BEARING ASSEMBLY

(71) Applicant: BorgWarner Inc., Auburn Hills, MI (US)

(72) Inventors: Erwin Perry Ellwood, III, Candler, NC (US); Kenneth Richard Bischof, Arden, NC (US); Raj Chandramohanan, Fletcher, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 17/523,120

(22) Filed: Nov. 10, 2021

(51) Int. Cl.
*F01D 25/16* (2006.01)
*F02B 37/10* (2006.01)
*F16C 33/58* (2006.01)
*F02B 37/00* (2006.01)

(52) U.S. Cl.
CPC ............ *F01D 25/168* (2013.01); *F02B 37/00* (2013.01); *F02B 37/10* (2013.01); *F16C 33/58* (2013.01); *F05D 2220/40* (2013.01); *F16C 2360/22* (2013.01)

(58) Field of Classification Search
CPC ........ F01D 25/168; F02B 37/10; F16C 33/58; F16C 2360/22; F05D 2220/40
See application file for complete search history.

(56) References Cited

U.S. PATENT DOCUMENTS 9,816,551 B2 * 11/2017 Regnier ................ F01D 25/162
10,495,144 B1   12/2019 Ellwood, III et al.

* cited by examiner

*Primary Examiner* — Audrey B. Walter
*Assistant Examiner* — Edward Bushard
(74) *Attorney, Agent, or Firm* — Howard & Howard Attorneys PLLC

(57) ABSTRACT

A turbocharger includes a shaft, a compressor wheel, a turbine wheel, and a bearing assembly including an inner race, a first outer race spaced from the inner race, a second outer race spaced from the inner race, a first rolling element disposed between the first outer race and the inner race, and a second rolling element disposed between the second outer race and the inner race. The bearing assembly includes a first biasing member configured to bias the first outer race toward the second outer race and against the first rolling element, and preload the first rolling element with a preloading force, and a second biasing member configured to bias the second outer race toward the first outer race and against the second rolling element, and preload the second rolling element with a second preloading force. The first preloading force is different than the second preloading force.

20 Claims, 3 Drawing Sheets

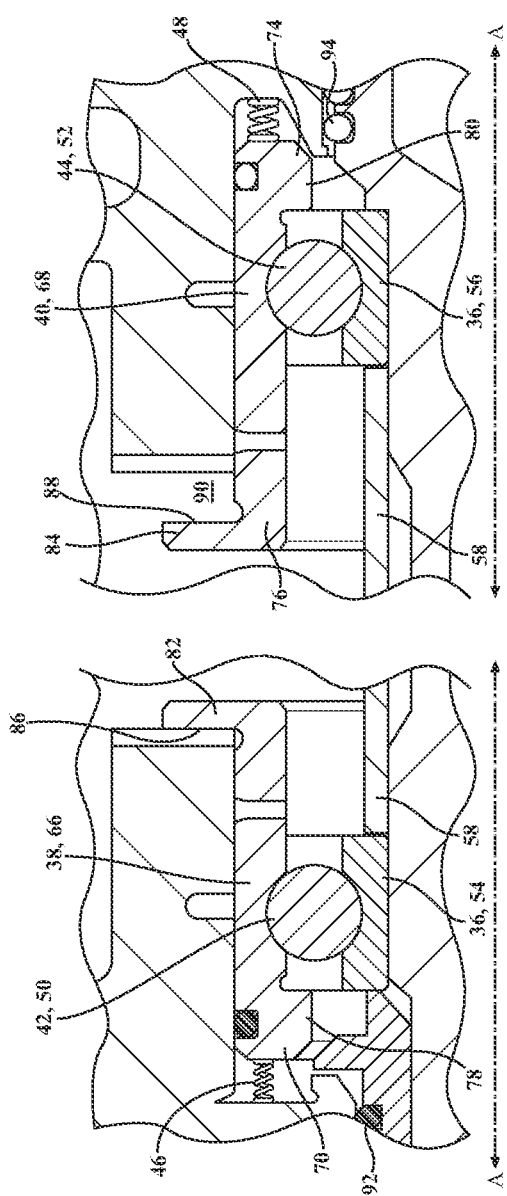

TURBOCHARGER INCLUDING BEARING ASSEMBLY

BACKGROUND OF THE INVENTION

1. Field of the Invention

The invention generally relates to a turbocharger including a bearing assembly.

2. Description of the Related Art

Turbochargers receive exhaust gas from an internal combustion engine and deliver compressed air to the internal combustion engine. Turbochargers are used to increase power output of the internal combustion engine, lower fuel consumption of the internal combustion engine, and reduce emissions produced by the internal combustion engine. Delivery of compressed air to the internal combustion engine by the turbocharger allows the internal combustion engine to be smaller, yet able to develop the same or similar amount of horsepower as larger, naturally aspirated internal combustion engines. Having a smaller internal combustion engine for use with a vehicle reduces the mass and aerodynamic frontal area of the vehicle, which helps reduce fuel consumption of the internal combustion engine and improve fuel economy of the vehicle.

Typical turbochargers include a turbine housing defining a turbine housing interior, a turbine wheel disposed in the turbine housing interior for receiving exhaust gas from the internal combustion engine, and a shaft coupled to and rotatable by the turbine wheel. Typical turbochargers also include a compressor housing defining a compressor housing interior, and a compressor wheel disposed in the compressor housing interior and coupled to the shaft. The compressor wheel is rotatable by the shaft for delivering compressed air to the internal combustion engine. Specifically, energy from the exhaust gas from the internal combustion engine, which would normally be wasted energy, is used to rotatably drive the turbine wheel, which is used to rotatably drive the shaft and, in turn, rotatably drive the compressor wheel to compress air and deliver compressed air to the internal combustion engine.

Commonly, turbochargers include a bearing assembly disposed about the shaft. The bearing assemblies are known to support rotation of the shaft. Moreover, the bearing assemblies known in the art commonly include various components which are subject to axial motion during operation of the turbocharger. However, bearing assemblies known in the art are subject to failure due to the axial motion of the various components of the bearing assemblies. More specifically, repeated wear on various components of the bearing assemblies can result due to the repeated axial motion of the various components.

Moreover, the repeated axial motion of the various components of the bearing assemblies may cause damage to other components of the turbocharger beyond the various components of the bearing assemblies. For example, turbochargers known in the art commonly include one or more piston rings disposed about the shaft to prevent exhaust gas in the turbine housing interior from contacting the bearing assemblies. However, repeated axial motion of the various components of the bearing assemblies may cause wear or other damage to the piston rings, thus allowing exhaust gas in the turbine housing interior to contact the bearing assemblies. Contact between exhaust gas and the bearing assemblies further damages the bearing assemblies and degrades lubrication for the bearing assemblies. Moreover, contact between exhaust gas and the bearing assemblies may also result in functional failure of the bearing assemblies, resulting in the bearing assemblies failing to adequately support rotation of the shaft of the turbocharger.

As such, there remains a need for an improved bearing assembly for a turbocharger.

SUMMARY OF THE INVENTION AND ADVANTAGES

A turbocharger for delivering compressed air to an internal combustion engine includes a shaft extending along an axis between a first shaft portion and a second shaft portion spaced from the first shaft portion along the axis. The turbocharger also includes a compressor wheel coupled to the first shaft portion of the shaft, and a turbine wheel coupled to the second shaft portion of the shaft. The turbocharger further includes a bearing assembly between the first shaft portion of the shaft and the second shaft portion of the shaft. The bearing assembly is coupled to the shaft for supporting rotation of the shaft.

The bearing assembly includes an inner race coupled to the shaft between the first shaft portion of the shaft and the second shaft portion of the shaft. The bearing assembly also includes a first outer race proximate to the first shaft portion of the shaft and spaced radially from the inner race, and a second outer race spaced from the first outer race along the axis, proximate to the second shaft portion of the shaft, and spaced radially from the inner race. Moreover, the bearing assembly further includes a first rolling element disposed between the first outer race and the inner race for supporting rotation of the shaft and includes a second rolling element disposed between the second outer race and the inner race for supporting rotation of the shaft.

The bearing assembly further includes a first biasing member coupled to the first outer race and configured to bias the first outer race toward the second outer race and against the first rolling element, and preload the first rolling element with a preloading force. The bearing assembly further includes a second biasing member coupled to the second outer race and configured to bias the second outer race toward the first outer race and against the second rolling element, and preload the second rolling element with a second preloading force. The first preloading force is different than the second preloading force.

Because the first preloading force on the first rolling element is different than the second preloading force on the second rolling element, axial motion of the first outer race, the first rolling element, the second outer race, and the second rolling element is reduced. Reduced axial motion limits wear on the first outer race, the first rolling element, the second outer race, and the second rolling element. and failure of the bearing assembly is prevented.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 3A is an exploded view of the bearing assembly of FIG. 2, with the bearing assembly including a first squeeze film damper cup; and FIG. 3B is an exploded view of the bearing assembly of FIG. 2, with the bearing assembly including a second squeeze film damper cup.

DETAILED DESCRIPTION OF THE INVENTION

Figure 1:
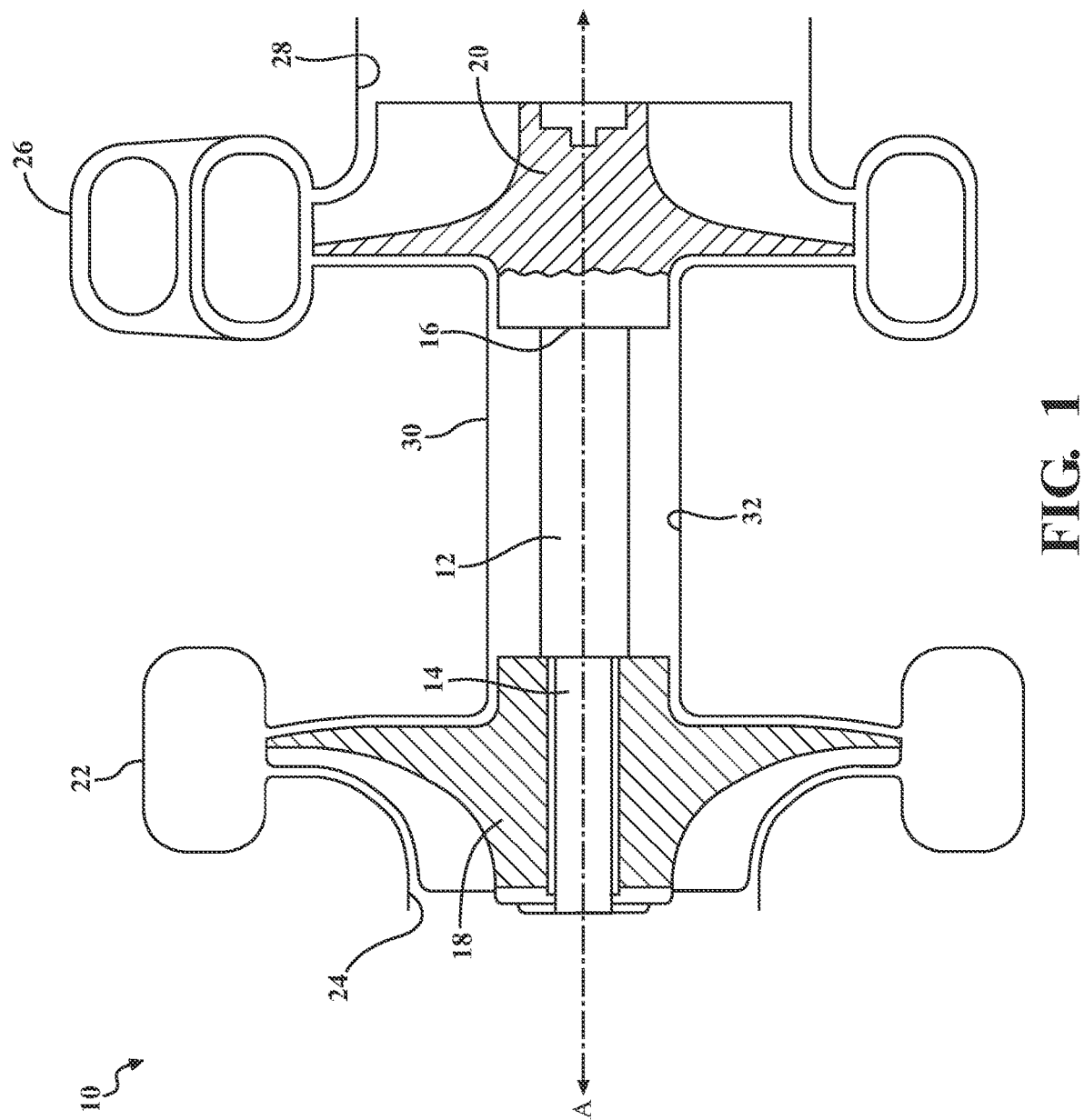
FIG. 1 is a schematic illustration of a turbocharger including a shaft extending along an axis, a compressor wheel coupled to the shaft, and a turbine wheel coupled to the shaft.

With reference to the Figures, wherein like numerals indicate like parts throughout the several views, a turbocharger 10 for delivering compressed air to an internal combustion engine is shown in FIG. 1. The turbocharger 10 includes a shaft 12 extending along an axis A between a first shaft portion 14 and a second shaft portion 16 spaced from the first shaft portion 14 along the axis A. The turbocharger 10 also includes a compressor wheel 18 coupled to the first shaft portion 14 of the shaft 12, and a turbine wheel 20 coupled to the second shaft portion 16 of the shaft 12. The turbocharger 10 may include a compressor housing 22 defining a compressor housing interior 24 in which the compressor wheel 18 is disposed, and a turbine housing 26 defining a turbine housing interior 28 in which the turbine wheel 20 is disposed. The turbocharger may also include a bearing housing 30 defining a bearing housing interior 32. The turbocharger 10 further includes a bearing assembly 34 between the first shaft portion 14 of the shaft 12 and the second shaft portion 16 of the shaft 12. The bearing assembly 34 is coupled to the shaft 12 for supporting rotation of the shaft 12. The bearing assembly 34 may be disposed in the bearing housing interior 32.

Figure 2:
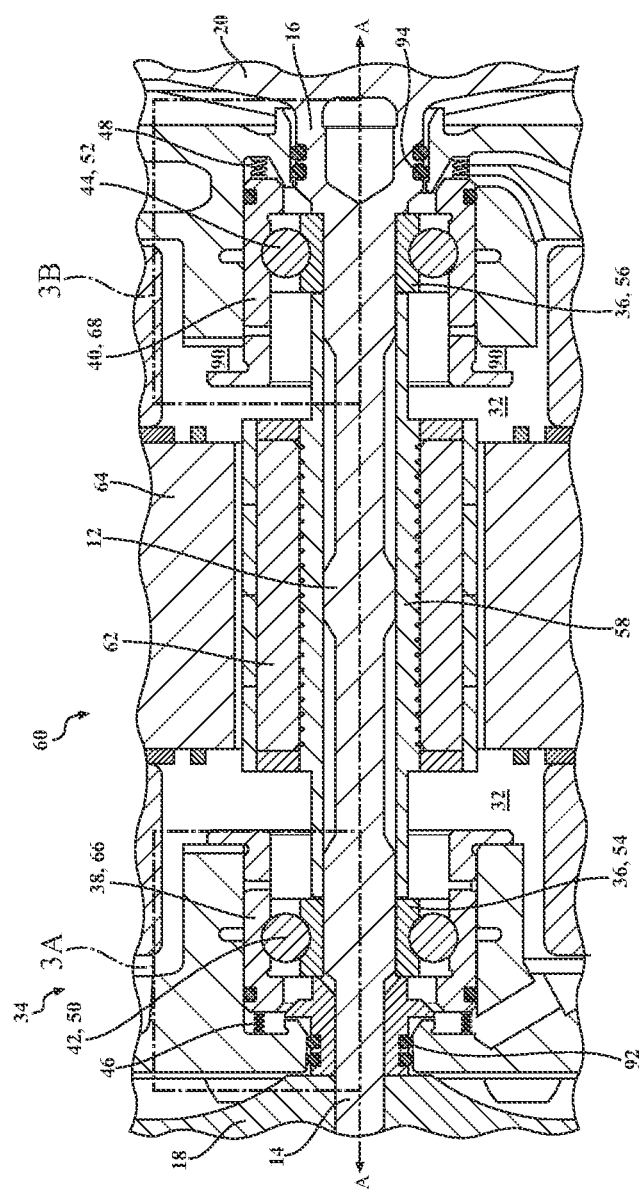
FIG. 2 is a cross-sectional view of the turbocharger of FIG. 1, with the turbocharger including a bearing assembly for supporting rotation of the shaft, and with the bearing assembly including an inner race, a first outer race, a second outer race, a first rolling element, a second rolling element, a first biasing member, and a second biasing member.

As shown in FIG. 2, the bearing assembly 34 includes an inner race 36 coupled to the shaft 12 between the first shaft portion 14 of the shaft 12 and the second shaft portion 16 of the shaft 12. The bearing assembly 34 also includes a first outer race 38 proximate to the first shaft portion 14 of the shaft 12 and spaced radially from the inner race 36, and a second outer race 40 spaced from the first outer race 38 along the axis A, proximate to the second shaft portion 16 of the shaft 12, and spaced radially from the inner race 36. Moreover, the bearing assembly 34 further includes a first rolling element 42 disposed between the first outer race 38 and the inner race 36 for supporting rotation of the shaft 12 and includes a second rolling element 44 disposed between the second outer race 40 and the inner race 36 for supporting rotation of the shaft 12.

The bearing assembly 34 further includes a first biasing member 46 coupled to the first outer race 38 and configured to bias the first outer race 38 toward the second outer race 40 and against the first rolling element 42, and preload the first rolling element 42 with a preloading force. The bearing assembly 34 further includes a second biasing member 48 coupled to the second outer race 40 and configured to bias the second outer race 40 toward the first outer race 38 and against the second rolling element 44, and preload the second rolling element 44 with a second preloading force. The first preloading force is different than the second preloading force.

Because the first preloading force on the first rolling element 42 is different than the second preloading force on the second rolling element 44, axial motion of the first outer race 38, the first rolling element 42, the second outer race 40, and the second rolling element 44 is reduced. Reduced axial motion limits wear on the first outer race 38, the first rolling element 42, the second outer race 40, and the second rolling element 44. and failure of the bearing assembly 34 is prevented.

The first rolling element 42 of the bearing assembly 34 may be a first ball bearing 50. Similarly, the second rolling element 44 of the bearing assembly 34 may be a second ball bearing 52. It is to be appreciated, however, that the first and second rolling elements 46, 48 may be any number of geometric shapes, including cylindrical, and may be bushings or roller bearings.

The inner race 36 of the bearing assembly 34 may be of numerous designs. In one embodiment, the inner race 36 is a unitary component. In other words, the inner race 36 may extend approximately between the first and second shaft portions 14, 16 of the shaft 12 such that the inner race 36 is a single piece between the first and second rolling elements 42, 44.

Alternatively, the inner race 36 may include a first inner race 54 disposed between the first outer race 38 and the shaft 12, and may include a second inner race 56 disposed between the second outer race 40 and the shaft 12. In the embodiments with the first and second inner races 54, 56, the first inner race 54 and the second inner race 56 are separate components. The first inner race 54 may extend approximately from the first shaft portion 14 of the shaft 12 toward the second inner race 56. Similarly, the second inner race 56 may extend approximately from the second shaft portion 16 of the shaft 12 toward the first inner race 54. The first and second inner races 54, 56 may contact one another in a location disposed approximately between the first and second shaft portions 14, 16 of the shaft 12. The first and second inner races 54, 56 may be symmetrically mirrored about the location disposed approximately between the first and second shaft portions 14, 16 of the shaft 12.

In yet another embodiment, the bearing assembly 34 further includes a spacer 58 disposed between the first inner race 54 and the second inner race 56 to hold the first inner race 54 between the first outer race 38 and the shaft 12, and to hold the second inner race 56 between the second outer race 40 and the shaft 12. The spacer 58 may be disposed in the location disposed approximately between the first and second shaft portions 14, 16 of the shaft 12. The spacer 58 is comparatively inexpensive and allows for the first and second inner races 54, 56 to be smaller, thus saving manufacturing costs of the first and second inner races 54, 56. In the embodiments with the spacer 58, the first and second inner races 54, 56 may also be symmetrically mirrored about the location disposed approximately between the first and second shaft portions 14, 16 of the shaft 12.

As shown in FIG. 2, the turbocharger 10 may further include an electric machine 60, such as an electric motor and/or an electric generator, disposed about the shaft 12. The electric machine 60 may be disposed in the bearing housing interior 32 of the bearing housing 30. The electric machine 60 may include a rotor 62 coupled to the shaft 12 and configured to rotate with the shaft 12, a stator 64 spaced radially from the rotor 62 and including a plurality of windings which are capable of being energized to impart rotational energy to the rotor 62, and thus to the shaft 12. The electric machine 60 may assist the turbocharger 10 in delivering compressed air to the internal combustion engine by increasing the rotational speed of the shaft 12 if the exhaust gas from the internal combustion engine is inadequate in imparting rotational energy to the turbine wheel 20. The electric machine 60 generally increases the axial tolerances of various components in the turbocharger 10. As such, the axial motion that is generated during operation of the turbocharger 10 further impacts the various components of the bearing assembly 34 in the embodiments where the electric machine 60 is present.

Although not required, as shown in FIG. 2, the bearing assembly 34 may further include a first squeeze film damper cup 66 rotationally fixed relative to the first outer race 38, and a second squeeze film damper cup 68 rotationally fixed relative to the second outer race 40. It is to be appreciated that the first squeeze film damper cup 66 and the first outer race 38 may be formed integrally with one another. Alternatively, the first squeeze film damper cup 66 and the first outer race 38 may be separate components. In the embodiments where the first squeeze film damper cup 66 is a separate component from the first outer race 38, the first outer race 38 may be press-fit in, or otherwise physically affixed to, the first squeeze film damper cup 66. Similarly, it is to be appreciated that the second squeeze film damper cup 68 and the second outer race 40 may be formed integrally with one another. Alternatively, the second squeeze film damper cup 68 and the second outer race 40 may be separate components. In the embodiments where the second squeeze film damper cup 68 is the separate component from the second outer race 40, the second outer race 40 may be press-fit in, or otherwise physically affixed to, the second squeeze film damper cup 68.

The first biasing member 46 may be in operable contact with the first squeeze film damper cup 66 to bias the first squeeze film damper cup 66 toward the second squeeze film damper cup 68 and preload the first rolling element 42 with the first preloading force. The second biasing member 48 may be in operable contact with the second squeeze film damper cup 68 to bias the second squeeze film damper cup 68 toward the first squeeze film damper cup 66 and preload the second rolling element 44 with the second preloading force.

The first biasing member 46 may be in direct contact with the first squeeze film damper cup 66. However, it is to be appreciated that the first biasing member 46 need not be in direct contact with the first squeeze film damper cup 66. The first biasing member 46 need only be in operable contact with the first squeeze film damper cup 66. As such, there may be included an additional component(s) disposed between the first biasing member 46 and the first squeeze film damper cup 66 as long as the first biasing member 46 is capable of biasing the first squeeze film damper cup 66 toward the second squeeze film damper cup 68 and preload the first rolling element 42 with the first preloading force.

The second biasing member 48 may be in direct contact with the second squeeze film damper cup 68. However, it is to be appreciated that the second biasing member 48 need not be in direct contact with the second squeeze film damper cup 68. The second biasing member 48 need only be in operable contact with the second squeeze film damper cup 68. As such, there may be included an additional component(s) disposed between the second biasing member 48 and the second squeeze film damper cup 68 as long as the second biasing member 48 is capable of biasing the second squeeze film damper cup 68 toward the first squeeze film damper cup 66 and preload the second rolling element 44 with the second preloading force.

The first squeeze film damper cup 66 may have a first outer end portion 70 proximal to the compressor wheel 18 and a first inner end portion 72 distal to the compressor wheel 18. The second squeeze film damper cup 68 may have a second outer end portion 74 proximal to the turbine wheel 20 and a second inner end portion 76 distal to the turbine wheel 20. The first biasing member 46 may be in operable contact with the first outer end portion 70 of the first squeeze film damper cup 66 and the second biasing member 48 may be in operable contact with the second outer end portion 74 of the second squeeze film damper cup 68. The first biasing member 46 may be configured to bias the first squeeze film damper cup 66 toward the second squeeze film damper cup 68 by exerting the first preloading force against the first outer end portion 70 of the first squeeze film damper cup 66 in a first biasing direction that is axially toward the second squeeze film damper cup 68. Moreover, the second biasing member 48 may be configured to bias the second squeeze film damper cup 68 toward the first squeeze film damper cup 66 by exerting the second preloading force against the second outer end portion 74 of the second squeeze film damper cup 68 in a second biasing direction that is axially toward the first squeeze film damper cup 66.

The first biasing member 46 may be in direct contact with the first outer end portion 70 of the first squeeze film damper cup 66. However, it is to be appreciated that the first biasing member 46 need not be in direct contact with the first outer end portion 70 of the first squeeze film damper cup 66. The first biasing member 46 need only be in operable contact with the first outer end portion 70 of the first squeeze film damper cup 66. As such, there may be included an additional component(s) disposed between the first biasing member 46 and the first outer end portion 70 of the first squeeze film damper cup 66 as long as the first biasing member 46 is capable of biasing the first squeeze film damper cup 66 toward the second squeeze film damper cup 68 and preload the first rolling element 42 with the first preloading force.

The second biasing member 48 may be in direct contact with the second outer end portion 74 of the second squeeze film damper cup 68. However, it is to be appreciated that the second biasing member 48 need not be in direct contact with the second outer end portion 74 of the second squeeze film damper cup 68. The second biasing member 48 need only be in operable contact with the second outer end portion 74 of the second squeeze film damper cup 68. As such, there may be included an additional component(s) disposed between the second biasing member 48 and the second outer end portion 74 of the second squeeze film damper cup 68 as long as the second biasing member 48 is capable of biasing the second squeeze film damper cup 68 toward the first squeeze film damper cup 66 and preload the second rolling element 44 with the second preloading force.

The first outer end portion 70 of the first squeeze film damper cup 66 may have a first lip 78 extending radially toward the shaft 12. The first lip 78 is configured to prevent the first squeeze film damper cup 66 from moving axially beyond the first outer race 38. The second outer end portion 74 of the second squeeze film damper cup 68 may have a second lip 80 extending radially toward the shaft 12. The second lip 80 is configured to prevent the second squeeze film damper cup 68 from moving axially beyond the second outer race 40. Moreover, the first inner end portion 72 of the first squeeze film damper cup 66 may have a first shoulder 82 extending radially away from the shaft 12, and the second inner end portion 76 of the second squeeze film damper cup 68 may have a second shoulder 84 extending radially away from the shaft 12.

Although not required, as shown in FIG. 3A, in the embodiments with the bearing housing 30 defining the bearing housing interior 32, the first shoulder 82 of the first squeeze film damper cup 66 may have a first contact surface 86 extending radially away from the shaft 12 and facing the compressor wheel 18. The first contact surface 86 of the first shoulder 82 is in operable contact with the bearing housing 30. The first contact surface 86 of the first shoulder 82 may be in direct contact with the bearing housing 30. However, it is to be appreciated that the first contact surface 86 of the first shoulder 82 need not be in direct contact with the bearing housing 30. The first contact surface 86 of the first shoulder 82 need only be in operable contact with the bearing housing 30. As such, there may be included an additional component(s) disposed between the first contact surface 86 of the first shoulder 82 and the bearing housing 30 as long as the first contact surface of the first shoulder 82 is capable of directly contacting the additional component(s) disposed between the first contact surface 86 of the first shoulder 82 and the bearing housing 30.

As shown in FIG. 3B, the second shoulder 84 may have a second contact surface 88 extending radially away from the shaft 12 and facing the turbine wheel 20. Although not required, a gap 90 may be defined axially between the second contact surface 88 of the second shoulder 84 and the bearing housing 30. The gap 90 may be between about 0.05 millimeters and about 0.5 millimeters, may be between about 0.1 millimeters and about 0.4 millimeters, may be between about 0.1 millimeters and about 0.3 millimeters, may be between about 0.1 millimeters and about 0.25 millimeters, may be between about 0.1 millimeters and about 0.2 millimeters, may be between about 0.15 millimeters and about 0.2 millimeters, and may be about 0.17 millimeters.

Moreover, as shown in FIG. 2, the turbocharger 10 may further include a first piston ring 92 disposed about the shaft 12 and a second piston ring 94 disposed about the shaft 12 and spaced from the first piston ring 92 along the axis A. The first piston ring 92 may separate the compressor housing interior 24 of the compressor housing 22 from the bearing housing interior 32 of the bearing housing 30. The second piston ring 94 may separate the turbine housing interior 28 of the turbine housing 26 from the bearing housing interior 32 of the bearing housing 30. The second piston ring 94 limits the exhaust gas in the turbine housing interior 28 from entering the bearing housing interior 32, degrading lubrication in the bearing housing interior 32 and potentially damaging the bearing assembly 34.

Although not required, the second preloading force may be greater than the first preloading force. In the embodiments where the second preloading force is greater than the first preloading force, there may exist a net preloading force on the bearing assembly 34 toward the compressor wheel 18. This net preloading force on the bearing assembly 34 toward the compressor wheel 18 limits contact between components of the bearing assembly 34 and the second piston ring 94. Thus, reduced axial motion resulting from the first biasing member 46 and the second biasing member 48 further limits wear on the second piston ring 94 in the embodiments where the second preloading force is greater than the first preloading force. Limiting wear on the second piston ring 94 also limits exhaust gas from the turbine housing interior 28 entering the bearing housing interior 32, thus limiting degradation of lubrication in the bearing housing interior 32, preventing potential damage to the bearing assembly 34, and thus preventing failure of the bearing assembly 34 supporting rotation of the shaft 12. Moreover, an efficiency of the compressor wheel 18 may improve as a result of the net preloading force on the bearing assembly 34 toward the compressor wheel 18. More specifically, the net preloading force on the bearing assembly 34 toward the compressor wheel 18 may improve the efficiency of the compressor wheel 18 by reducing axial clearances between the compressor wheel 18, the first piston ring 92, the bearing assembly 34, and/or the inner race 36.

The first preloading force may be between about 10 Newtons and about 100 Newtons, between about 15 Newtons and about 90 Newtons, between about 25 Newtons and about 75 Newtons, between about 30 Newtons and about 70 Newtons, between about 40 Newtons and about 60 Newtons, and may be about 50 Newtons. The second preloading force may be between about 100 Newtons and about 300 Newtons, between about 110 Newtons and about 250 Newtons, between about 125 Newtons and about 200 Newtons, between about 130 Newtons and about 170 Newtons, and may be about 150 Newtons.

The first biasing member 46 may have a first spring constant, and the second biasing member 48 may have a second spring constant. The first spring constant of the first biasing member 46 may be different than the second spring constant of the second biasing member 48. In some embodiments, the second spring constant of the second biasing member 48 is greater than the first spring constant of the first biasing member 46. Because the second spring constant of the second biasing member 48 is greater than the first spring constant of the first biasing member 46, the second preloading force is greater than the first preloading force, and the associated advantages as described above are achieved.

Moreover, it is to be appreciated that the first biasing member 46 may be a coil spring (e.g., a compression spring, a helical spring), a disc spring (e.g., a Belleville spring), a conical spring, a wave spring, or a slotted disk spring, among other possibilities. The second biasing member 48 may be a coil spring (e.g., a compression spring, a helical spring), a disc spring (e.g., a Belleville spring), a conical spring, a wave spring, or a slotted disk spring, among other possibilities. The first biasing member 46 may have a first width (e.g., a first gauge), the second biasing member 48 may have a second width (e.g., a second gauge), and the second width of the second biasing member 48 may be greater than the first width of the first biasing member 46. Because the second width of the second biasing member 48 is greater than the first width of the first biasing member 46, the second preloading force is greater than the first preloading force, and the associated advantages thereof described above are achieved.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A turbocharger for delivering compressed air to an internal combustion engine, said turbocharger comprising:
   a shaft extending along an axis between a first shaft portion and a second shaft portion spaced from said first shaft portion along said axis;
   a compressor wheel coupled to said first shaft portion of said shaft;
   a turbine wheel coupled to said second shaft portion of said shaft; and
   a bearing assembly between said first and second shaft portions of said shaft and coupled to said shaft for supporting rotation of said shaft, said bearing assembly comprising:

an inner race coupled to said shaft between said first and second shaft portions of said shaft;

a first outer race proximate to said first shaft portion of said shaft and spaced radially from said inner race;

a second outer race spaced from said first outer race along said axis, proximate to said second shaft portion of said shaft, and spaced radially from said inner race;

a first rolling element disposed between said first outer race and said inner race for supporting rotation of said shaft;

a second rolling element disposed between said second outer race and said inner race for supporting rotation of said shaft;

a first biasing member coupled to said first outer race and configured to bias said first outer race toward said second outer race and against said first rolling element, and preload said first rolling element with a first preloading force; and a second biasing member coupled to said second outer race and configured to bias said second outer race toward said first outer race and against said second rolling element, and preload said second rolling element with a second preloading force;

wherein said first preloading force is different than said second preloading force.

2. The turbocharger as set forth in claim 1, wherein said second preloading force is greater than said first preloading force.

3. The turbocharger as set forth in claim 1, wherein said first preloading force is between about 10 Newtons and about 100 Newtons.

4. The turbocharger as set forth in claim 1, wherein said first preloading force is between about 25 Newtons and about 75 Newtons.

5. The turbocharger as set forth in claim 1, wherein said second preloading force is between about 100 Newtons and about 300 Newtons.

6. The turbocharger as set forth in claim 1, wherein said second preloading force is between about 125 Newtons and about 200 Newtons.

7. The turbocharger as set forth in claim 1, wherein said first biasing member has a first spring constant, wherein said second biasing member has a second spring constant, and wherein said first spring constant of said first biasing member is different than said second spring constant of said second biasing member.

8. The turbocharger as set forth in claim 7, wherein said second spring constant of said second biasing member is greater than said first spring constant of said first biasing member.

9. The turbocharger as set forth in claim 1, wherein said bearing assembly further comprises a first squeeze film damper cup rotationally fixed relative to said first outer race, and a second squeeze film damper cup rotationally fixed relative to said second outer race.

10. The turbocharger as set forth in claim 9, wherein said first squeeze film damper cup has a first outer end portion proximal to said compressor wheel and a first inner end portion distal to said compressor wheel, wherein said second squeeze film damper cup has a second outer end portion proximal to said turbine wheel and a second inner end portion distal to said turbine wheel, wherein said first outer end portion of said first squeeze film damper cup has a first lip extending radially toward said shaft and configured to prevent said first squeeze film damper cup from moving axially beyond said first outer race, and wherein said second outer end portion of said second squeeze film damper cup has a second lip extending radially toward said shaft and configured to prevent said second squeeze film damper cup from moving axially beyond said second outer race.

11. The turbocharger as set forth in claim 9, wherein said first biasing member is in operable contact with said first squeeze film damper cup to bias said first squeeze film damper cup toward said second squeeze film damper cup and preload said first rolling element with said first preloading force, and wherein said second biasing member is in operable contact with said second squeeze film damper cup to bias said second squeeze film damper cup toward said first squeeze film damper cup and preload said second rolling element with said second preloading force.

12. The turbocharger as set forth in claim 11, wherein said first squeeze film damper cup has a first outer end portion proximal to said compressor wheel and a first inner end portion distal to said compressor wheel, wherein said second squeeze film damper cup has a second outer end portion proximal to said turbine wheel and a second inner end portion distal to said turbine wheel, wherein said first biasing member is in operable contact with said first outer end portion and said second biasing member is in operable contact with said second outer end portion.

13. The turbocharger as set forth in claim 9, wherein said first squeeze film damper cup has a first outer end portion proximal to said compressor wheel and a first inner end portion distal to said compressor wheel, wherein said second squeeze film damper cup has a second outer end portion proximal to said turbine wheel and a second inner end portion distal to said turbine wheel, wherein said first inner end portion of said first squeeze film damper cup has a first shoulder extending radially away from said shaft, and wherein said second inner end portion of said second squeeze film damper cup has a second shoulder extending radially away from said shaft.

14. The turbocharger as set forth in claim 13 further comprising a bearing housing disposed about said shaft between said compressor wheel and said turbine wheel, with said bearing housing defining a bearing housing interior and with said bearing assembly disposed in said bearing housing interior, wherein said first shoulder has a first contact surface extending radially away from said shaft and facing said compressor wheel, and wherein said first contact surface of said first shoulder is in operable contact with said bearing housing.

15. The turbocharger as set forth in claim 13 further comprising a bearing housing disposed about said shaft between said compressor wheel and said turbine wheel, with said bearing housing defining a bearing housing interior and with said bearing assembly disposed in said bearing housing interior, wherein said second shoulder has a second contact surface extending radially away from said shaft and facing said turbine wheel, and wherein a gap is defined axially between said second contact surface of said second shoulder and said bearing housing.

16. The turbocharger as set forth in claim 15, wherein said gap is between about 0.05 millimeters and about 0.5 millimeters.

17. The turbocharger as set forth in claim 15, wherein said gap is between about 0.1 millimeters and about 0.3 millimeters.

18. A bearing assembly for supporting rotation of a shaft in a turbocharger, said bearing assembly comprising:

an inner race extending along an axis and configured to be coupled to the shaft between first and second shaft portions of the shaft;

a first outer race spaced radially from said inner race and configured to be proximate to the first shaft portion of the shaft;

a second outer race spaced radially from said inner race, spaced from said first outer race along said axis, and configured to be proximate to the second shaft portion of the shaft;

a first rolling element disposed between said first outer race and said inner race for supporting rotation of the shaft;

a second rolling element disposed between said second outer race and said inner race for supporting rotation of the shaft;

a first biasing member coupled to said first outer race and configured to bias said first outer race toward said second outer race and against said first rolling element, and preload said first rolling element with a first preloading force; and a second biasing member coupled to said second outer race and configured to bias said second outer race toward said first outer race and against said second rolling element, and preload said second rolling element with a second preloading force, wherein said first preloading force is different than said second preloading force.

19. The bearing assembly as set forth in claim 18, wherein said second preloading force is greater than said first preloading force.

20. The bearing assembly as set forth in claim 18, wherein said first biasing member has a first spring constant, wherein said second biasing member has a second spring constant, and wherein said second spring constant of said second biasing member is greater than said first spring constant of said first biasing member.

* * * * *